United States Patent
Rieken et al.

(10) Patent No.: US 9,294,147 B2
(45) Date of Patent: Mar. 22, 2016

(54) TWACS TRANSMITTER AND RECEIVER

(71) Applicant: Aclara Technologies LLC, Hazelwood, MO (US)

(72) Inventors: David W. Rieken, St. Peters, MO (US); John B. Hessling, Jr., Maryland Heights, MO (US)

(73) Assignee: Aclara Technologies LLC, Hazelwood, MO (US)

( * ) Notice: Subject to any disclaimer, the term of this patent is extended or adjusted under 35 U.S.C. 154(b) by 0 days.

(21) Appl. No.: 14/492,617

(22) Filed: Sep. 22, 2014

(65) Prior Publication Data

US 2015/0092868 A1    Apr. 2, 2015

Related U.S. Application Data

(60) Provisional application No. 61/885,296, filed on Oct. 1, 2013.

(51) Int. Cl.
*H04L 27/28* (2006.01)
*H04B 3/54* (2006.01)
*H04B 15/02* (2006.01)

(52) U.S. Cl.
CPC ............... *H04B 3/542* (2013.01); *H04B 15/02* (2013.01); *H04B 2203/5412* (2013.01); *H04B 2203/5433* (2013.01)

(58) Field of Classification Search
CPC .......... H04B 3/542; H04B 1/62; H04B 15/02; H04L 27/2647; H04L 5/0007; H04L 27/2657; H04L 27/2662; H04L 5/0048
USPC ........................... 375/260, 259, 316, 295, 219
See application file for complete search history.

(56) References Cited

U.S. PATENT DOCUMENTS

| | | |
|---|---|---|
| 4,658,238 A | 4/1987 | Mak |
| 4,914,418 A | 4/1990 | Mak et al. |
| 4,918,422 A | 4/1990 | Mak |
| 4,963,853 A | 10/1990 | Mak |
| 4,996,513 A | 2/1991 | Mak et al. |
| 5,198,796 A | 3/1993 | Hessling, Jr. |
| 5,262,755 A | 11/1993 | Mak et al. |
| 5,486,805 A | 1/1996 | Mak |
| 5,617,084 A | 4/1997 | Sears |
| 5,696,441 A | 12/1997 | Mak et al. |
| 5,856,776 A | 1/1999 | Armstrong et al. |

(Continued)

FOREIGN PATENT DOCUMENTS

WO        90/13950        11/1990

*Primary Examiner* — Zewdu Kassa
(74) *Attorney, Agent, or Firm* — Senniger Powers LLP

(57) ABSTRACT

As disclosed, a two-way automatic communications system (TWACS) and method are used by an electrical utility in which outbound messages are sent from the utility to a consumer and inbound messages are sent from the consumer to the utility. The respective outbound and inbound messages are sent and received over the utility's power distribution system. A receiver including an analog filter component, an A/D converter and a digital processor detects the outbound messages. A substation transceiver is configured for sending analog outbound messages from the utility to a consumer. A transponder is configured for sending inbound messages to the transceiver from the consumer to the utility, the respective outbound and inbound messages being modulated on a mains signal of the utility's power distribution system. The receiver in another form includes an analog filter component, a detecting circuit and a demodulator.

26 Claims, 12 Drawing Sheets

(56) References Cited

U.S. PATENT DOCUMENTS

| | | |
|---|---|---|
| 6,172,597 B1 | 1/2001 | Brown |
| 6,320,899 B1 | 11/2001 | Chang et al. |
| 6,356,555 B1 | 3/2002 | Rakib et al. |
| 6,407,987 B1 | 6/2002 | Abraham |
| 6,940,396 B2 | 9/2005 | Hammond et al. |
| 7,496,430 B2 | 2/2009 | Mak |
| 7,593,378 B1 | 9/2009 | Murali et al. |
| 2002/0126741 A1 | 9/2002 | Baum et al. |
| 2004/0100898 A1 | 5/2004 | Anim-Appiah et al. |
| 2004/0218699 A1 | 11/2004 | Carsello |
| 2004/0222698 A1 | 11/2004 | Hammond et al. |
| 2005/0055586 A1* | 3/2005 | Flen et al. ............ 713/300 |
| 2007/0211401 A1 | 9/2007 | Mak |
| 2008/0030265 A1 | 2/2008 | Ido et al. |
| 2008/0225965 A1 | 9/2008 | Pi et al. |
| 2009/0058728 A1 | 3/2009 | Mostafa et al. |
| 2009/0257471 A1 | 10/2009 | Tanaka et al. |
| 2010/0124288 A1 | 5/2010 | Spencer et al. |
| 2011/0007782 A1 | 1/2011 | Takahashi et al. |
| 2012/0037400 A1* | 2/2012 | Fields et al. ............ 174/126.1 |
| 2012/0039400 A1 | 2/2012 | Rieken |
| 2013/0121426 A1 | 5/2013 | Drumeller |
| 2014/0010271 A1 | 1/2014 | Rydstrom et al. |

* cited by examiner

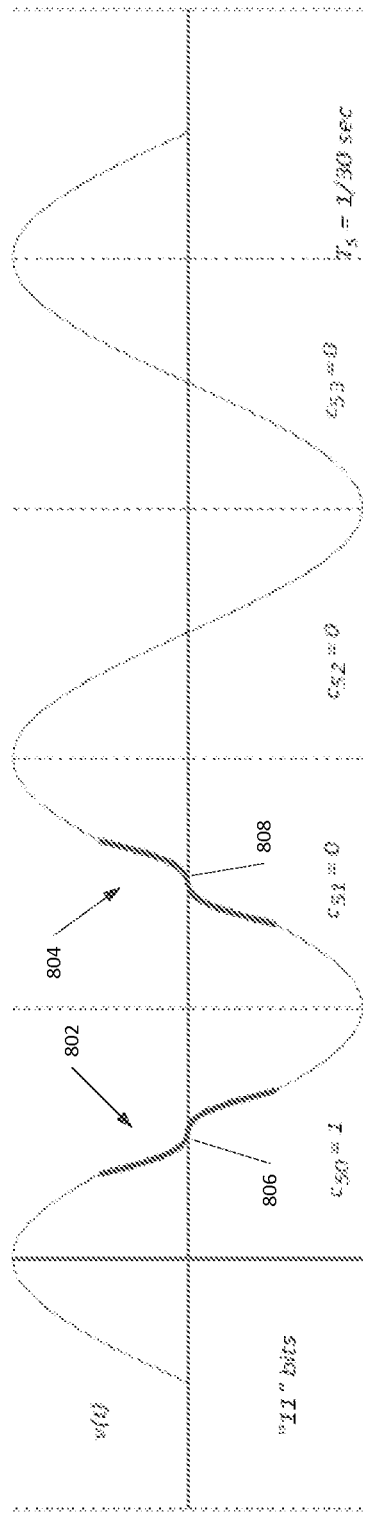

TWACS TRANSMITTER AND RECEIVER

BACKGROUND

This invention relates to communications sent through a power distribution network and, more particularly, to a point-to-point communications system by which information is readily transmitted from any one location within the power distribution network to any other location within the network. Specifically, the systems and methods relate to demodulating TWACS® (Two Way Automatic Communication System) outbound signals.

Power line communications systems are known in the art. A typical system enables a utility to send messages over its power line to or from a central location such as a substation to most, if not all, of its customers connected to that site. The messages involve such things as current electrical usage at the customer's site, polling requests to determine whether or not an outage has occurred within a service area, or commands to reduce or shut-off the amount of power provided to a load at the customer's site during periods of peak electrical usage. Replies received from the various locations to which messages are sent enable the utility to determine its current operational status, as well as changes that may need to be made to reconfigure the power distribution system for changes (or prospective changes) in its operating circumstances.

Electrical usage has grown significantly in recent years so that, over time, the demands placed on utilities have greatly increased and many utilities are now hard pressed to maintain adequate levels of service to their customers. Similarly, the demands placed on current communications systems employed by these utilities to support their operations have also greatly increased to the point where it has become difficult for these systems to timely provide the information necessary for the utility to operate at the level at which it needs to operate. For example, the amount of information required by the utility, on an almost continuous basis, has expanded to the point where the information throughput (data transmission rates) required of communications systems is at, or near the limits of the communications system's capabilities.

TWACS outbound signals have been decoded using comparators and timers. In this way the digital processor is supplied a sequence of times at which the incident signal has taken on known values. This has the advantage of not requiring expensive hardware.

The 30 bps analog outbound receiver requires a large signal-to-noise ratio (SNR) in order to maintain a reasonable bit error ratio. It is designed to work with a specific outbound signal constellation. The 30 bps constellation contains only two signals, each with a duration of two complete mains cycles. Thus, the data rate is only 1 bit every 1/30 seconds, or bps. Adapting the 30 bps receiver to an increased bit rate constellation is difficult because of the required large SNR.

There is a need for a receiver which receives and demodulates at a lower signal-to-noise ratio while maintaining a reasonable bit error ratio and which could be implemented on existing receivers without hardware changes. There is a need for a receiver which receives and demodulates a higher bit rate constellation and which could be implemented on general purpose microprocessors.

SUMMARY

As disclosed, a two-way automatic communications system (TWACS) and method are used by an electrical utility in which outbound messages are sent from the utility to a consumer and inbound messages are sent from the consumer to the utility. The respective outbound and inbound messages are sent and received over the utility's power distribution system. A receiver including an analog filter component, an A/D converter and a digital processor detects the outbound messages. The analog filter component receives the analog outbound signal including an outbound message to provide a filtered signal. The A/D converter converts the filtered signal to a corresponding digitized signal and provides the corresponding digitized signal. The digital processor executes a digital preprocessor component receiving the corresponding digitized signal, preprocessing the received corresponding digitized signal to provide a preprocessed digital signal, and a digital symbol determination component receiving the preprocessed digital signal and including a two-dimensional digital demodulating component for demodulating the received preprocessed digital signal to provide the outbound message.

The receiver in another form includes an analog filter component, a detecting circuit and a demodulator. The analog filter component receives an outbound signal including an outbound message provides a filtered signal including the outbound message. The detecting circuit receives the filtered signal including the outbound message provides a corresponding signal including the outbound message. The demodulator demodulates the corresponding signal by detecting at least two modulations every two cycles of the mains signal.

As disclosed, a two-way automatic communications system (TWACS) and method are used by an electrical utility. A substation transceiver is configured for sending analog outbound messages from the utility to a consumer. A transponder is configured for sending inbound messages to the transceiver from the consumer to the utility, the respective outbound and inbound messages being modulated on a mains signal of the utility's power distribution system. A receiver including in the transponder is configured for enabling the detection of the outbound messages, and includes:

an analog filter component receiving an outbound signal including an outbound message to provide a filtered signal including the outbound message; and a detecting circuit receiving the filtered signal including the outbound message to provide a corresponding signal including the outbound message; and a demodulator for demodulating the corresponding signal by detecting at least two modulations every two cycles of the mains signal.

The receiver in another form includes:

an analog filter component receiving the analog outbound signal including an outbound message to provide a filtered signal;

an A/D converter converting the filtered signal to a corresponding digitized signal and providing the corresponding digitized signal; and a digital processor executing a digital preprocessor component receiving the corresponding digitized signal, preprocessing the received corresponding digitized signal to provide a preprocessed digital signal, and a digital symbol determination component receiving the preprocessed digital signal and a two-dimensional digital demodulating component for digitally demodulating the received preprocessed digital signal to provide the outbound message.

Other features will be in part apparent and in part pointed out hereinafter.

BRIEF DESCRIPTION OF THE DRAWINGS

FIGS. 8A and 8B illustrate constellation waveforms for double rate balanced modulation in which every two bits of the outbound data stream will be encoded every two cycles of the AC waveform.

Corresponding reference characters indicate corresponding parts throughout the drawings.

DETAILED DESCRIPTION

30 Bps Modulation

Figure 1A:
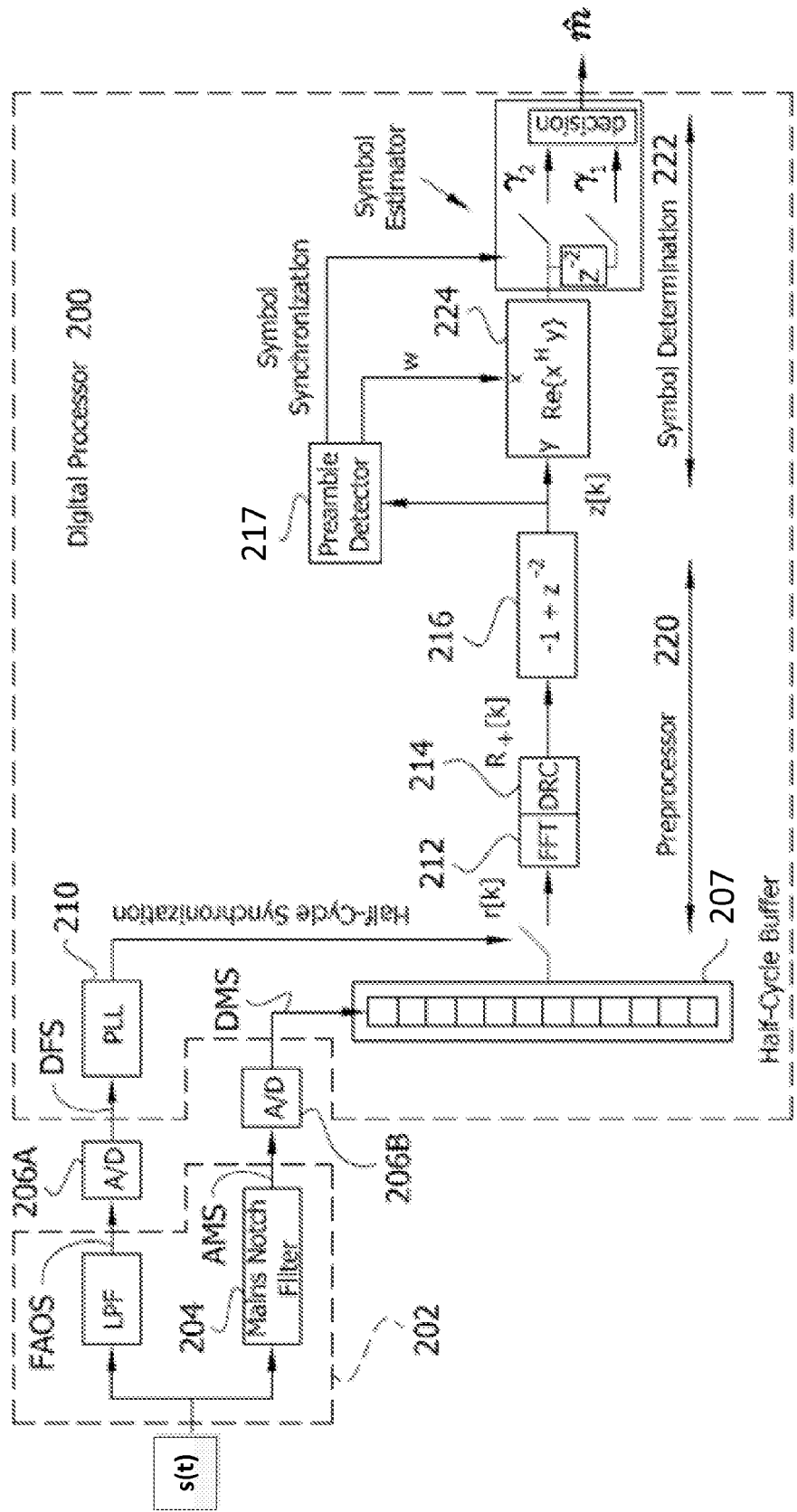
FIG. 1A is a block diagram of one embodiment of a receiver according to the invention.

A method and system transmits and receives data at higher speeds, which are faster than the above noted 30 bps method and system. In some forms, the higher speed methods and systems use the same transmitting equipment as 30 bps systems and methods so that no new receiver hardware is required. In some forms, symbol coding according to the invention for TWACS outbound bits allows transmission at a data rate (e.g., 90 bps) which is higher (e.g., three times) than the current TWACS outbound data rate. In outbound systems with high bit error ratios, the symbol coding used along with low rate channel codes improves performance without decreasing data rate.

In one form, the higher speed methods and systems are implemented by a firmware change in an SCE (Substation Communication Equipment) and a revised receiver algorithm on a digital signal processor-based (DSP-based) RCE (Remote Communication Equipment) platform, while retaining backward compatibility with existing, installed products.

According to aspects described herein, a higher speed outbound transmitter employs a form of on-off keying in which a signal is created as frequently as once every half cycle, or 120 Hz. The existing 30 bps system and method, described in U.S. Pat. No. 5,198,796, incorporated herein by reference in its entirety, transmits this signal once every four (4) half-cycles, altering the location of the "on" half-cycle within its four half-cycle sequence to differentiate between a 0 and a 1 (e.g., 30 bps). The data rate can be increased up to 120 bps by transmitting or not transmitting the signal every half cycle, the former to indicate a 1 and the latter to indicate a 0. Thus, one bit is transmitted every half-cycle. This requires a modified receiver firmware configuration to remove the 60 Hz mains signal and its harmonics (herein referred to as power-line interference or PLI). The methods and systems mitigate PLI by transmitting 3 bits every 4 half-cycles, for a sustained data rate of up to 90 bps on 60 Hz systems. Similarly, on 50 Hz systems, the data rate would be up to 75 bps.

This provides an increase in transmission speed as compared to the current 30 bps outbound TWACS at the cost of little more than a firmware upgrade to existing substation equipment. Further, the higher speed methods and systems can be retrofitted to existing TWACS outbound equipment.

30 Bps Modulation

Figure 5:
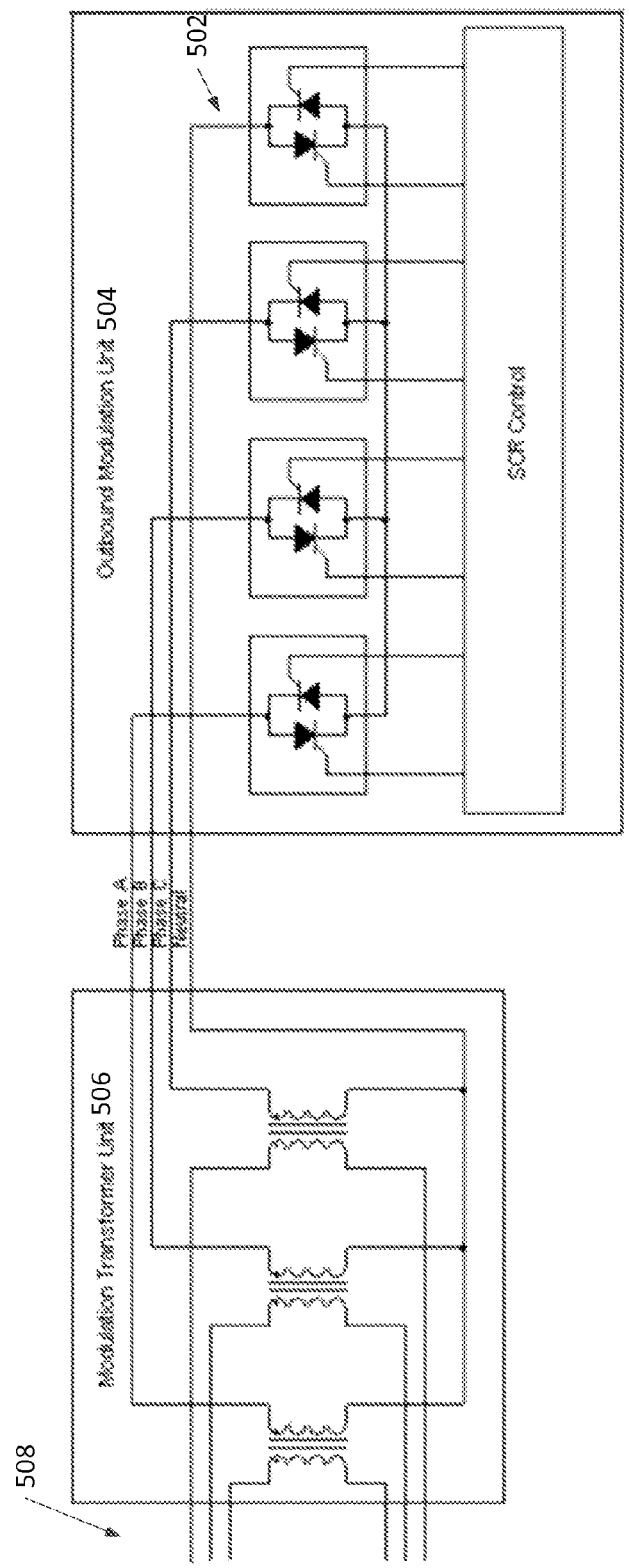
FIG. 5 is a block diagram of one embodiment of a TWACS outbound transmitter for implementing the invention.

The 30 bps modulation scheme uses a phase controlled silicon-controlled rectifier (SCR) array connected to Phase A, Phase B, Phase C and Neutral connections on a modulation transformer configured with a wye secondary (see FIG. 5). By selecting specific combinations of SCRs, current pulses can be placed on any one of the six various phasor combinations. The 30 bps product selects, at random, the rising or falling edge of the particular phasor and switches on the SCR combination injecting a phase controlled current pulse near (around) the zero crossing of that edge of the voltage waveform.

The combination of modulation and no modulation is used to create the ones and zeros of the binary data stream that is being transmitted. Each bit of the modulation takes two cycles of the AC waveform to encode. A one bit is created by a modulated cycle followed by an un-modulated cycle (see FIG. 6A). Conversely, a zero bit is created by an un-modulated cycle followed by a modulated cycle (see FIG. 6B).

Outbound messages are composed of a 9 bit synchronization pattern followed by a message that incorporates a length field, CRC, opcode, data, etc. The 9 bit synchronization pattern is composed of a zero start bit, followed by "111 001 0" bits and terminated by a zero stop bit. The rest of the bytes of the message do not use start or stop bits.

Detection of 30 bps TWACS Modulation

The Remote Transponder Units use a waveform tracking technique that compares adjacent cycles of the waveform looking for outbound modulation. The transponder synchronizes to the synchronization pattern of "OE4H" and then continues to collect outbound bits for the encoded length of the message. In this modulation, a 9 bit synchronization pattern begins a with a "0" start bit and is followed by "1110010" and a "0" stop bit. When combined, these bits are a 9 bit pattern, i.e., "011100100". This is a binary number that when expressed as a hexadecimal number is "0E4". The number system can be added to the number, for example, "011100100B" or "0E4H". Thus, the "0E4H" synchronization pattern is a short hand designation for describing the "0" start bit followed by "1110010" and "0" stop bit synchronization pattern.

The outbound detector collects data from the tracker each half cycle. It compares that data to the data collected 1 cycle ago and determines if it is "1" or a "0". It also calculates signal strength and stores that information. It then analyzes the last 33 half cycle comparisons worth of data and determines if the synchronization pattern is detected. After qualifying the pattern, the transponder synchronizes to the message, framing every two cycles. It compares the data collected from second zero crossing with the fourth zero crossing. If there is modulation on fourth zero cross, then a zero stored into the outbound message buffer. If there is modulation on the second zero cross, then a one is stored into the outbound message buffer.

High Speed Modulation

One embodiment of a system for performing this modulation is demonstrated in FIG. 1A, described in detail below. As noted in U.S. Published Patent Application 20120039400, a single TWACS outbound symbol with a duration of 4 half-cycles can be described by the equation:

$$s_m(t) = \sum_{k=0}^{3} c_{mk}(-1)^k g(t-kT_p) \quad \text{(II.1)}$$

where $c_{mk} \in \{0, 1\}$ and g(t) is the signal generated by the transmitter in one half-cycle when it is firing. The received signal vector is $$r_k = \sqrt{E_g} c_{mk}(-1)^k + n_k + r_{PLI,k} \quad \text{(II.2)}$$

where $$r_{PLI,k} = (-1)^k q_1 + q_2. \quad \text{(II.3)}$$

The values taken by $q_1$ and $q_2$ do not impact modulation. It is only necessary to note that, in general, PLI resides within the space spanned by the vectors $$v_1 = \begin{bmatrix} 1 \\ 1 \\ 1 \\ 1 \end{bmatrix} \quad \text{(II.4)}$$

$$v_2 = \begin{bmatrix} 1 \\ -1 \\ 1 \\ -1 \end{bmatrix}.$$

PLI can be eliminated by projecting the received signal onto the subspace orthogonal to both $V_1$ and $V_2$. The following operation performs that projection:

$$\gamma = \begin{bmatrix} 1 & 0 & -1 & 0 \\ 0 & 1 & 0 & -1 \end{bmatrix} r. \quad \text{(II.5)}$$

There are many such matrices that will project onto this subspace. This one has the advantage of mapping any TWACS signal set onto a Cartesian grid. The first row is also the optimal additive white Gaussian noise (AWGN) receiver for 30 bps TWACS and the second row is the same but shifted in time. This simplifies the task of modifying the existing receiver for higher speed modulation.

Figure 2:
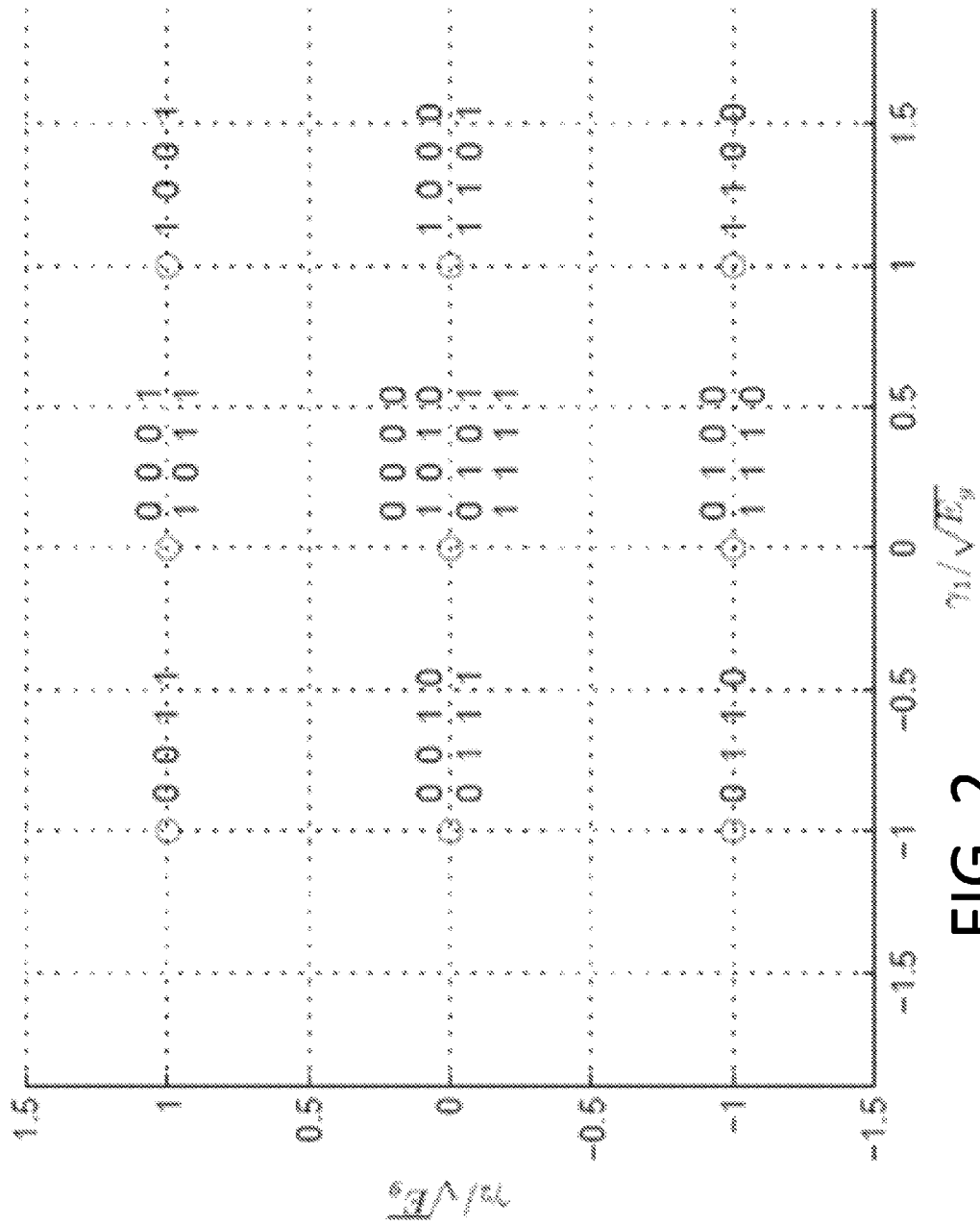
FIG. 2 is mapping of 16 possible outbound signals.

FIG. 2 is computed by mapping 16 possible outbound signals in equation (II.2) using the projection in equation (II.5). The values of $c_{mk}$ required to get each point in the constellation are noted next to the point. There are 9 unique values of $\gamma$, so one is discarded to give M=8, resulting in a bit rate of 3 bits per symbol. Bit error rate is minimized by eliminating all signals yielding $\gamma=[0\ 0]^T$.

The following Table 1 illustrates signal constellation and symbol values:

TABLE 1

| m | $c_{m0}$ | $c_{m1}$ | $c_{m2}$ | $c_{m3}$ | binary value |
|---|---|---|---|---|---|
| 0 | 1 | 0 | 0 | 1 | 001 |
| 1 | 0 | 0 | 0 | 1 | 011 |
| 2 | 0 | 0 | 1 | 1 | 010 |
| 3 | 0 | 0 | 1 | 0 | 110 |
| 4 | 0 | 1 | 1 | 0 | 111 |
| 5 | 0 | 1 | 0 | 0 | 101 |
| 6 | 1 | 1 | 0 | 0 | 100 |
| 7 | 1 | 0 | 0 | 0 | 000 |

In some cases different signals yield the same $\gamma$. For example, $c=[0\ 1\ 0\ 0]^T$ results in $\gamma=[0\ -1]^T$ as does $c=[1\ 1\ 1\ 0]^T$. While transmission of either symbol will give the same result at the receiver, transmitted energy is minimized by using the former rather than the latter. The resulting signal library is summarized in Table 1. While any binary value may be assigned to each signal, bit error ratio is minimized by using a gray code. The suggested gray code is also delineated in the above Table 1, above.

Preamble:

One complete outbound packet consists of a preamble followed immediately by the signal sequence:

$$s(t) = \underbrace{\sum_{k=0}^{K_p-1} p_k(-1)^k g(t-kT_p)}_{preamble} + \underbrace{\sum_{k=0}^{L_s-1} s_{m[k]}(t-kT_s-K_pT_p)}_{message}. \quad \text{(III.1)}$$

Here $K_p$ is the number of half-cycles comprising a preamble, $p_k \in \{0, 1\}$ indicates whether the transmitter fired during the kth half-cycle, $L_s$ is the number of symbols in the message (number of bits divided by three) and m[k] is the kth transmitted symbol. The preamble need be nothing specific. However, to minimize the number of changes necessary in the receiver, the preamble can be the same as in the 30 bps mode. That is, $K_p=36$ with $p_k$ as shown in the following Table 2:

TABLE 2

| k | 0 | 1 | 2 | 3 | 4 | 5 | 6 | 7 | 8 | 9 | 10 | 11 |
|---|---|---|---|---|---|---|---|---|---|---|---|---|
| Pk | 0 | 0 | 0 | 1 | 0 | 1 | 0 | 0 | 0 | 1 | 0 | 0 |
| k | 12 | 13 | 14 | 15 | 16 | 17 | 18 | 19 | 20 | 21 | 22 | 23 |
| Pk | 0 | 1 | 0 | 0 | 0 | 0 | 0 | 1 | 0 | 0 | 0 | 1 |
| k | 24 | 25 | 26 | 27 | 28 | 29 | 30 | 31 | 32 | 33 | 34 | 35 |
| Pk | 0 | 1 | 0 | 0 | 0 | 0 | 0 | 1 | 0 | 0 | 0 | 1 |

Receiver Modifications

The receiver algorithm is illustrated in FIG. 1A. It is similar to the 30 bps receiver described in U.S. Published Patent Application 20120039400. One difference is that the decision statistic is two-dimensional. As suggested by (II.5), the first element of $\gamma_1$ is simply the second element $\gamma_2$ delayed by one half-cycle.

Figure 3:
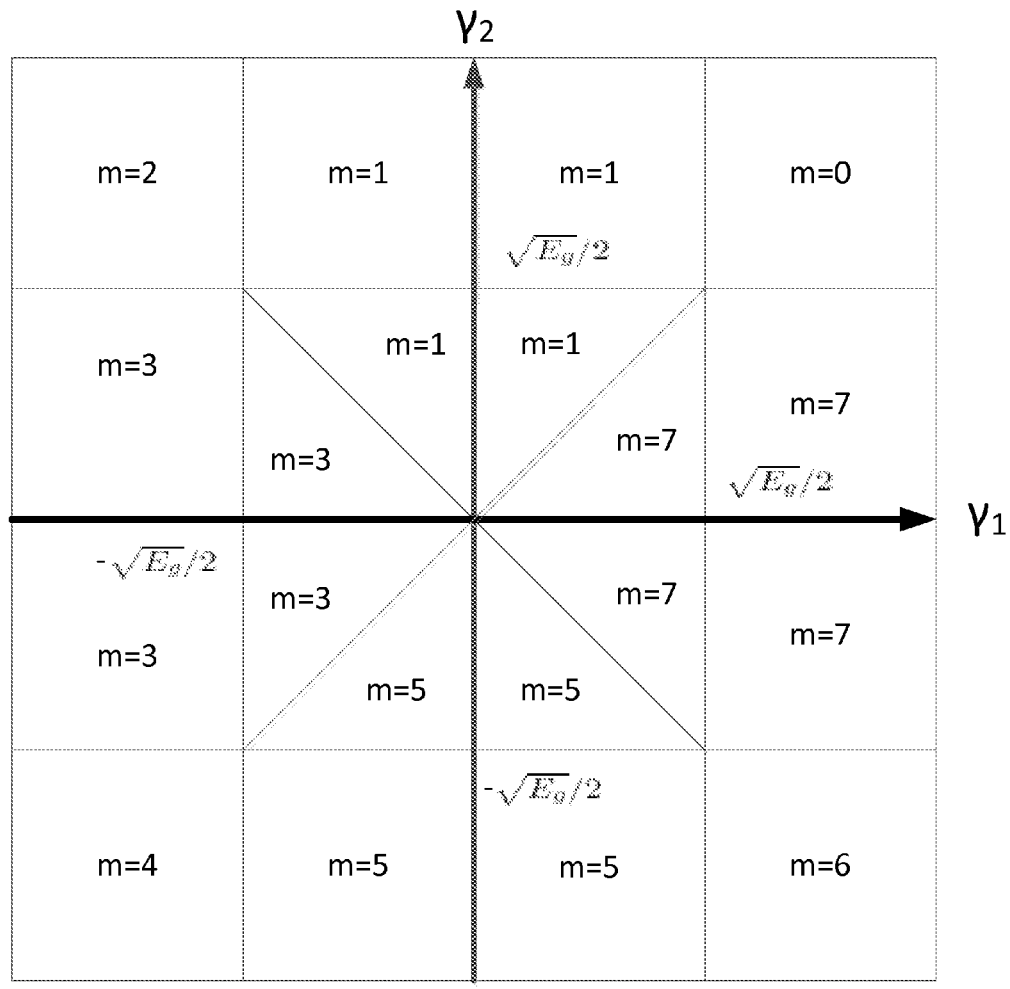
FIG. 3 illustrates the optimal decision regions of the 16 possible outbound signals of FIG. 2.

Decision regions are indicated by FIG. 2. Boundaries are drawn at $\sqrt{E_g/2}$ and $-\sqrt{E_g/2}$ in both the $\gamma_1$ and $\gamma_2$ axes. If the received signal lies within the resulting box at the center of the grid, for which there is no equivalent transmitted signal, a decision must be made to resolve the ambiguity. The optimal decision regions, assuming equiprobable signaling in AWGN, are shown in FIG. 3. In the event that the $$\|\gamma_n\| < \sqrt{E_g}/2$$

for both n, then a decision is made by comparing $\gamma_1$ to $\gamma_2$. This requires few additional clock cycles for the receiver DSP to perform.

The receiver need only know what $E_g$ is in order to draw the needed decision regions. Fortunately, this can be derived from an estimate (e.g., $\tilde{G}(f)$) retrieved from the preamble detector (see preamble detector 217 in FIG. 1A). Since the preamble is unchanged from the 30 bps receiver, nothing needs change in the preamble detector.

Comparison to 30 bps TWACS

Referring to Table 1, there are 4 signals in which $\Sigma_k c_{mk}=1$ and 4 signals in which $\Sigma_k c_{mk}=2$. Assuming equiprobable signaling, the average energy per symbol is $$E_{avg} = \frac{1}{2}E_g + \frac{1}{2}2E_g = \frac{3}{2}E_g. \quad (V.1)$$

For a symbol rate of 30 Hz, the transmit power is $$P_{avg}(90)=30E_{avg}=45E_g. \quad (V.2)$$

Compare this to 30 bps outbound TWACS wherein the symbol rate is also 30 Hz, but $\Sigma_k c_{mk}=1$ for all m giving an average symbol energy of $E_g$.

$$P_{avg}(30)=30E_g. \quad (V.3)$$

Thus, in some embodiments, the 90 bps outbound TWACS as described herein can require 50% more power than 30 bps outbound TWACS provided the same transmission method is used.

For simplicity, the probability of symbol error for a 9-element signal constellation is computed. Both $\gamma_1$ and $\gamma_2$ are compared to a decision threshold independent of the other. If either one is incorrect then a symbol error has occurred. Consider first the probability of an incorrect decision in just $\gamma_1$. The variables $n_k$ are independent, identically distributed random variables with mean zero and variance $N_0/2$.

By equation (II.5), $\gamma_1$ and $\gamma_2$ are independent random variables with variance $$\text{var}(\gamma_n)=N_0. \quad (V.4)$$

A zero-mean normal random variable n is defined with a variance $N_0$. There are 3 decision regions with boundaries at $\pm\sqrt{E_g}/2$. An error occurs on the leftmost symbol if $n<\sqrt{E_g}/2$, on the rightmost symbol if $n>-\sqrt{E_g}/2$, and on the center symbol if $|n|>\sqrt{E_g}/2$. Assuming equiprobable symbols, the probability of $\gamma_1$ being incorrectly demodulated is then $$P'_e = \frac{1}{3}P\left([n] > \frac{\sqrt{E_g}}{2}\right) + \frac{2}{3}P\left(n > \frac{\sqrt{E_g}}{2}\right) \quad (V.5)$$

$$= \frac{1}{3} \times 2Q\left(\frac{\sqrt{E_g}/2}{\sqrt{N_0}}\right) + \frac{2}{3}Q\left(\frac{\sqrt{E_g}/2}{\sqrt{N_0}}\right)$$

$$= \frac{4}{3}Q\left(\sqrt{\frac{E_g}{4N_0}}\right)$$

The following Table 3 compares 90 bps modulation to 30 bps modulation:

TABLE 3

| option | $E_b$(90 bps)/ $E_b$(30 bps) | $P_{avg}$(90 bps)/ $P_{avg}$(30 bps) | $E_g$(90 bps)/ $E_g$(30 bps) |
|---|---|---|---|
| $E_g$ unchanged | −3.0 dB | 1.8 dB | 0.0 dB |
| $P_{avg}$ unchanged | −4.8 dB | 0.0 dB | −1.8 dB |
| $P_e$ unchanged | 3.2 dB | 8.0 dB | 6.2 dB |

This tradeoff summary can be expressed in terms of energy per bit by noting that $$E_b = \frac{1}{3}E_{avg} = \frac{1}{2}E_g. \quad (V.6)$$

Thus, $$P'_e = \frac{4}{3}Q\left(\sqrt{\frac{E_b}{2N_0}}\right) \quad (V.7)$$

The probability of symbol error is the probability that an error occurs in either dimension. Since $\gamma_1$ and $\gamma_2$ are independent and have identical variance and decisions, then $$P_e = 1 - (1 - P'_e)^2 \quad (V.8)$$

$$= 2P'_e - (P'_e)^2$$

$$= \frac{8}{3}Q\left(\sqrt{\frac{E_b}{2N_0}}\right) - \frac{16}{8}Q^2\left(\sqrt{\frac{E_b}{2N_0}}\right)$$

$$\approx \frac{8}{3}Q\left(\sqrt{\frac{E_b}{2N_0}}\right) \quad (V.9)$$

where the last step is approximately true for large SNRs. For gray codes at high SNRs, symbol errors result in a single bit error. Thus, the probability of bit error for 90 bps is:

$$P_b \approx \frac{1}{3}P_e = \frac{8}{9}Q\left(\sqrt{\frac{E_b}{2N_0}}\right) \quad (V.10)$$

Figure 4:
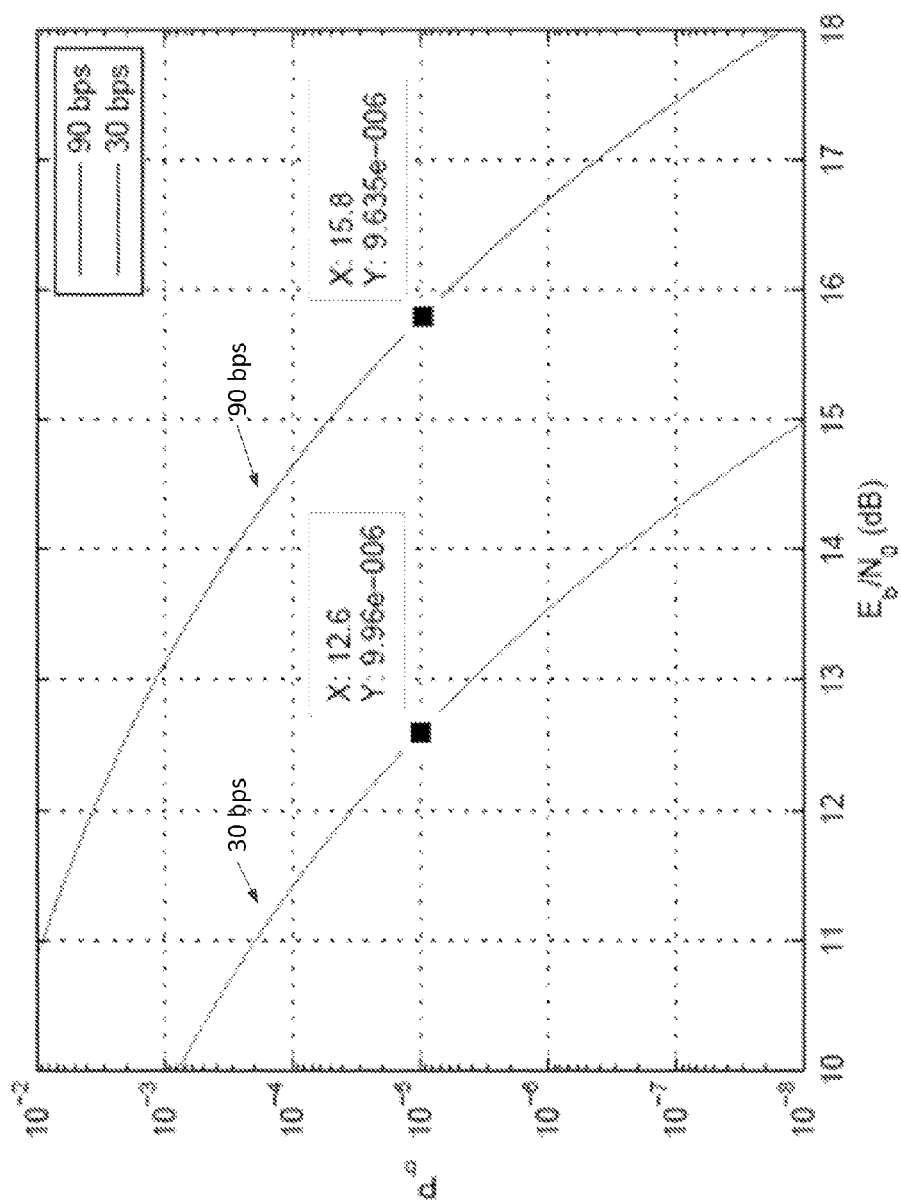
FIG. 4 is a graph comparing probability of bit error vs. SNR per bit for 30 bps and 90 bps TWACS outbound.

This is plotted in FIG. 4 alongside the probability of bit error for 30 bps outbound TWACS.

The above demonstrates about a 3 dB increase in required $E_b/N_0$ over the bps mode. However, it was shown in U.S. Published Patent Application 20120039400 that $E_b/N_0$ of around 30 dB is not uncommon. This is well above the requirement for either the bps or 90 bps mode as demonstrated in FIG. 4. The excess signal strength opens several options. Of particular interest is decreasing the transmitter power at the substation. Three options and the effect on signal energy, power, and energy per bit for each are summarized in Table 3, above.

In the first option, the firing angle is unchanged and as a consequence $E_g$ is the same as in 30 bps outbound TWACS. Signal power will therefore increase by 1.8 dB or 50%. This will decrease $E_b$ by 3 dB so that the SNR per bit should be 6.2 dB above that required to maintain the link in 30 bps outbound TWACS.

In the second option, the firing angle is adjusted so that the average signal power is the same as in 30 bps outbound TWACS. This tends to eliminate any risk involving heat dissipation in the transmission equipment. This results in an $E_b$ of 4.8 dB so that the SNR per bit should be 8 dB above what is required to maintain the link in 30 bps outbound TWACS.

The third option is to increase the signal strength about 8 dB so that $E_b$ increases by the SNR loss as illustrated in FIG. 4. This strategy can be pursued when a 30 bps outbound TWACS is near the operating point with the legacy signal power.

Implementation of the proposed higher rate transmission requires only minor changes to both the transmitter and the receiver. At its core, the nature of the transmission is unchanged. Only the patterns fired by the transmitter have changed.

The power expended at the substation in generating the signal can be significantly decreased while still making the link budget. As indicated in Table 2, keeping the same average power in the 90 bps mode as in the 30 bps mode reduces $E_b/N_0$ by 5 dB. However, in U.S. Published Patent Application 20120039400, $E_b/N_0$ for the 30 bps mode was shown to be near 30 dB. Since 16 dB is required to make the 90 bps link, $E_b/N_0$ can be decreased by 14 dB, which corresponds to a 9 dB allowable decrease in average power. Receivers expecting only a 30 bps signal will detect 90 bps packets since the preamble is the same.

Referring to the block diagram in FIG. 1A, the received signal, r(t), is operated on by a filter component 202 including a mains notch filter 204 to cancel out the 60 Hz (or 50 Hz) mains signal to provide an analog message signal (AMS). This is done to reduce the signal dynamic range and reduce quantization noise in the subsequent A/D conversion. The AMS is digitally sampled by A/D converter 206B to provide a digital message signal (DMS) stored in a FIFO buffer 206 large enough to accommodate at least one mains half-cycle worth of data. The received signal r(t) is also low-pass filtered (LPF) prior to digitizing by A/D converter 206A so that the mains signal is tracked without aliasing. The filtered analog outbound signal (FAOS) is converted by the A/D converter 206A to a digitized filtered signal (DFS). The DFS is provided to a digital phase-locked loop (PLL) 210 which tracks the mains signal and provides half-cycle synchronization. The converters 206 may be part of the digital processor 200 or separate components. When a half-cycle boundary occurs, the contents of the FIFO buffer 207 are passed to the next stage of the algorithm as a column vector.

The column vector is operated on by an FFT 212. The FFT (fast Fourier transform) is used with a dimension reducing component DRC 214 for reducing the dimensionality of the vector prior to computing its inner product. The DRC 214 eliminates unwanted signal components. Most of the elements of the vector output of the FFT can be discarded since the transmitted signal is bandlimited. Those elements not discarded should collectively represent that portion of the spectrum in which the SNR is significant. The resulting complex column vector, is a discretization of $R_{k+}(f)$. With a discretization algorithm in place, the receiver equation is approximated.

A sum is computed using a FIR filter 216 $[-1+z^{-2}]$. The output of this is fed to the inner product calculator. A preamble detector 217 provides symbol synchronization information. The synchronized stream is split into two steams, one of which is delayed by one-half cycle $[z^{-2}]$ and each is compared to 0 to determine the transmitted symbols.

The length field encodes the length of the variable fields of the outbound packet. The total length in bits is then an affine function of the value encoded in the length field. Prior to reading this field the length is set to a default value which should represent a maximum length. After the number of symbols retrieved corresponds to length the receiver is reset to search for preambles once more.

In summary, the digital processor 200 executes a digital preprocessor component 220 receiving the corresponding digitized signal r[k] and preprocessing the received corresponding digitized signal to provide a preprocessed digital signal z[k]. The processor 200 also executes a digital symbol determination component 222 receiving the preprocessed digital signal z[k] and digitally demodulating the received preprocessed digital signal z[k] in two dimensions to provide the outbound message (m̂). The symbol determination component 222 includes the preamble detector 217 which provides a weight vector w to a digital symbol estimation component 224 generating noise product signals $\gamma_1$ and $\gamma_2$ which are selectively sampled by the synchronization signal to provide the outbound message (m̂).

Three examples of modulation are described below: balanced modulation, double rate balanced modulation, and double strength balanced modulation. As noted above, FIG. 5 is a block diagram of one embodiment of a TWACS outbound modulator for implementing the invention. Modulation can be implemented using the same phase controlled SCR array used for 30 bps modulation. In particular, the SCR array is connected to Phase A, Phase B, Phase C and Neutral connections on a modulation transformer configured with a wye secondary.

Balanced Modulation

Figure 1B:
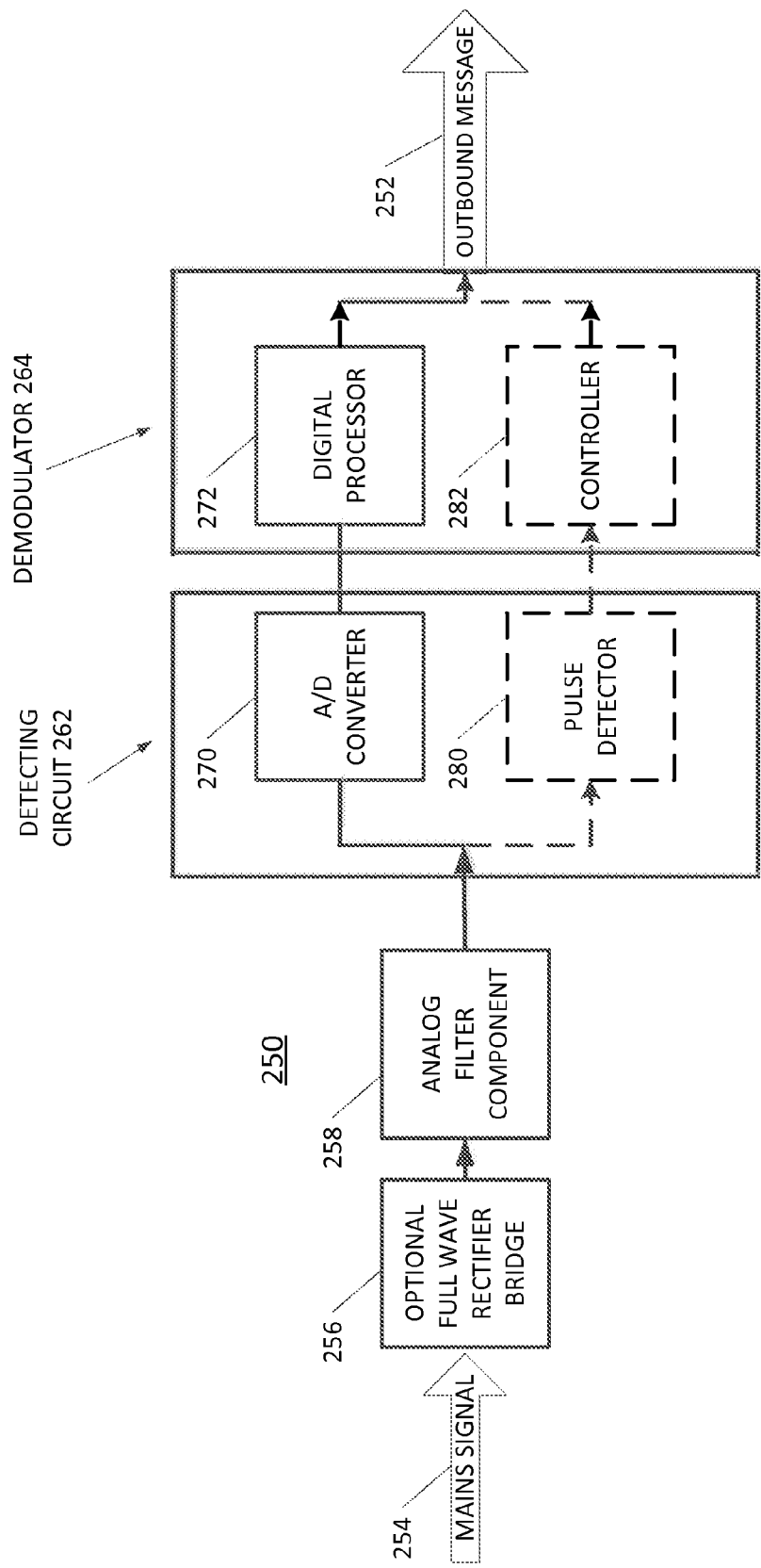
FIG. 1B is a block diagram of another embodiment of a receiver according to the invention.

FIG. 1B illustrates a receiver 250 having two alternative configurations for receiving signals having balanced modulation, double rate balanced modulation, and double strength balanced modulation. As noted herein, the receiver 250 is configured as part of a two-way automatic communications system (TWACS) used by an electrical utility in which outbound messages 252 are sent from the utility to a consumer, such as by a substation transceiver.

According to the TWACS system, inbound messages to the transceiver are sent from the consumer to the utility, such as by a transponder. The respective outbound and inbound messages are sent and received over the utility's power distribution system by being modulated on a mains outbound signal 254 of the power distribution system.

The receiver 250 is included in the transponder and is configured for enabling the detection of the outbound messages 252. An optional rectifier such as an optional full wave rectifier bridge 256 receives an analog outbound signal including an outbound message (e.g., on the mains outbound signal 254) and provides an outbound signal including the outbound message 252 corresponding thereto. An analog filter component 258 receives the outbound signal including the outbound message 252 and provides a filtered signal including the outbound message 260 corresponding thereto. A detecting circuit 262 receives the filtered signal including the outbound message 252 and provides a corresponding signal including the outbound message 252. A demodulator 264 demodulates the corresponding signal by detecting at least two modulations (e.g., two pulses) every two cycles of the mains signal, which pulses correspond to the outbound message 252.

In one configuration, the detecting circuit 262 comprises an A/D converter 270 and the demodulator comprises a digital processor 272, such as the A/D converter 206 and digital processor 200 of FIG. 1A. In this configuration, the mains signal is digitized by the A/D converter 270 and bit modulations (e.g., pulses) within the digitized signal are detected by the digital processor 272. The detected pulses are indicative of the outbound message 252.

In a second alternative configuration, the detecting circuit 262 comprises a pulse detector 280 and the demodulator comprises a controller 282, such as an analog control and logic circuit 31 and a microcontroller logic 21, as illustrated in FIG. 2 of U.S. Pat. No. 5,198,796, incorporated herein by reference. In this configuration, the bit modulations (e.g., pulses) on the mains signal are detected by the pulse detector 280 and the detected pulses timing is calculated by the microcontroller logic 21, which timing is indicative of the outbound message 252.

The second alternative configuration may employ the same or similar hardware as used to detect prior art signals except that the hardware is reconfigured to employ a different sampling scheme. Since many receivers in the field today use the same or similar hardware, these receivers can be remotely reprogrammed with new firmware to detect balanced modulation, double rate balanced modulation, and/or double strength balanced modulation according to the invention.

The following describes an outbound modulation coding system and method that produces a balanced outbound modulation. It also doubles the 30 bps outbound modulation rate without changes to the hardware in either the TWACS Outbound Modulator Unit (OMU) or in the TWACS Remote Transponder Units. Also, it can be used to double the outbound signal strength by aggregating outbound bit modulations (e.g., pulses). Instead of hardware changes or upgrades, the firmware is updated in both devices with a balanced sampling scheme in order to transmit and receive a balanced modulation. Once the OMU has been updated, it generates the standard outbound modulation, the double rate outbound modulation, balanced modulation or double strength modulation. Transponders that use only the standard TWACS outbound signal configuration co-exist on a system with transponders that are configured to handle the balanced signal configuration.

The balanced outbound modulation coding system and method compensates for a magnetization effect seen on delta-wye 50 Hz modulation transformers. These transformers generate a ghost bit modulation or pulse on the opposite slope of the AC waveform used to generate the outbound TWACS modulation. This ghost pulse results in a distortion on the voltage waveform which can affect the triggering and firing of the SCRs in the Outbound Modulator Unit. The imbalance in 30 bps imbalanced modulation causes a shift in B-H curve in the core of transformer. The transformer naturally recovers from this bias by generating ghost pulses on the opposite slope of the voltage waveform.

The balanced modulation coding systems and methods described herein produce a balancing effect on the core of the transformer cancelling out the magnetization bias being generated by the 30 bps TWACS Outbound Modulation signaling. The balanced modulation coding systems improve the bandwidth of the TWACS outbound signaling system and can be used with functions such as downloadable firmware, two way address assignment and other future applications which require more bandwidth. By introducing a specific coding into this balanced modulation coding system and method, the rate of transmission is increased by a factor of two.

There is a large installed base of TWACS equipment, so the balanced outbound modulation coding system and method can make use of the installed hardware and improve the bandwidth. The balanced modulation coding system and method described herein is compatible with the installed base of remote transponder units and can be implemented in the installed base without modification by modifying only the firmware in the outbound modulator unit of the installed base.

The balanced modulation system can use the same phase controlled SCR array 502 of outbound modulation unit 504 as illustrated in FIG. 5. The unit 504 is connected to Phase A, Phase B, Phase C and Neutral connections of a modulation transformer unit 506 configured with a wye secondary. The transformer primary 508 is connected to a power distribution system in a wye or delta configuration. Since the SCR array 502 is configured with anti-parallel connected SCRs, both rising and falling slopes can be selected alternately in addition to selecting the six various phasor combinations in order to implement the balance modulation coding. This balanced modulation coding system and method will use both rising and falling edges of the selected phasor, encoding the outbound message bits at a rate that is twice the current 30 bps rate. The balanced injection coding system and method will continue to switch the SCRs in phase controlled fashion, injecting phase controlled current pulses near (around) the zero crossing of the voltage waveform, utilizing both rising and falling edges.

Figure 6A:
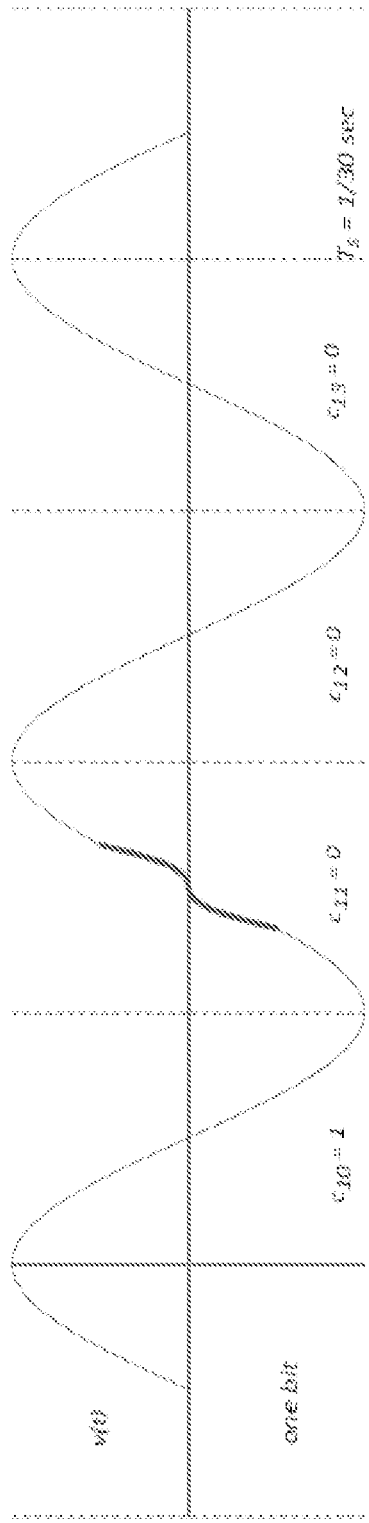
FIGS. 6A and 6B illustrate constellation waveforms for 30 bps outbound TWACS using binary signaling with four half-cycle symbol lengths of the AC waveform according to the prior art as noted in U.S. Published Patent Application 20120039400.
Figure 6B:
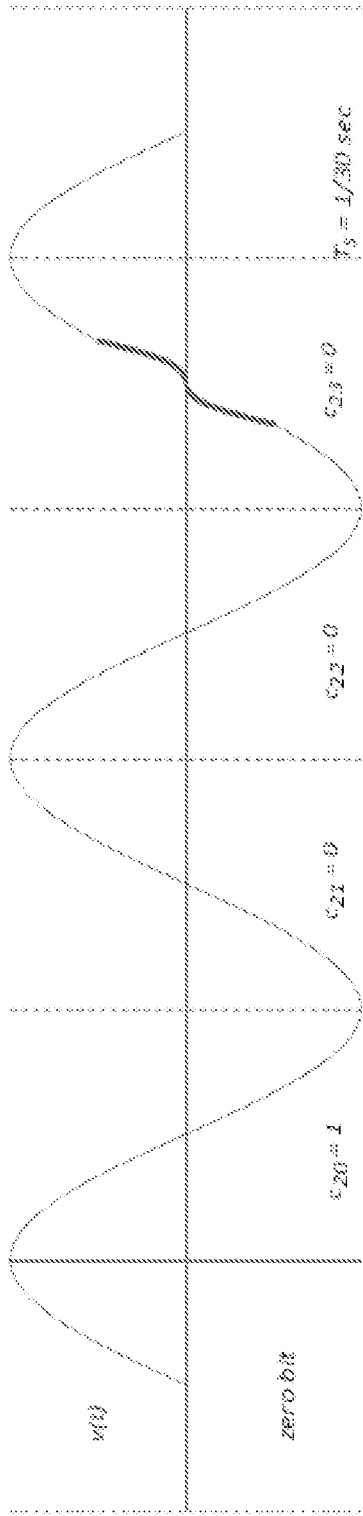

Outbound TWACS uses binary signaling with four half-cycle symbol lengths according to the prior art as noted in U.S. Pat. No. 5,198,796. The constellations depicted in FIGS. 6A and 6B correspond to binary 1 and 0, respectively:

no modulation, modulation, no modulation, no modulation=1 (FIG. 6A)

no modulation, no modulation, no modulation, modulation=0 (FIG. 6B)

The combination of modulation and no modulation will still be used to create ones and zeros of the binary data stream that is being transmitted, so that the 30 bps outbound detectors are compatible with balanced modulation and can still be used in the remote transponder units. Only one bit of the outbound data stream will be encoded every two cycles of the AC waveform.

Figure 7A:
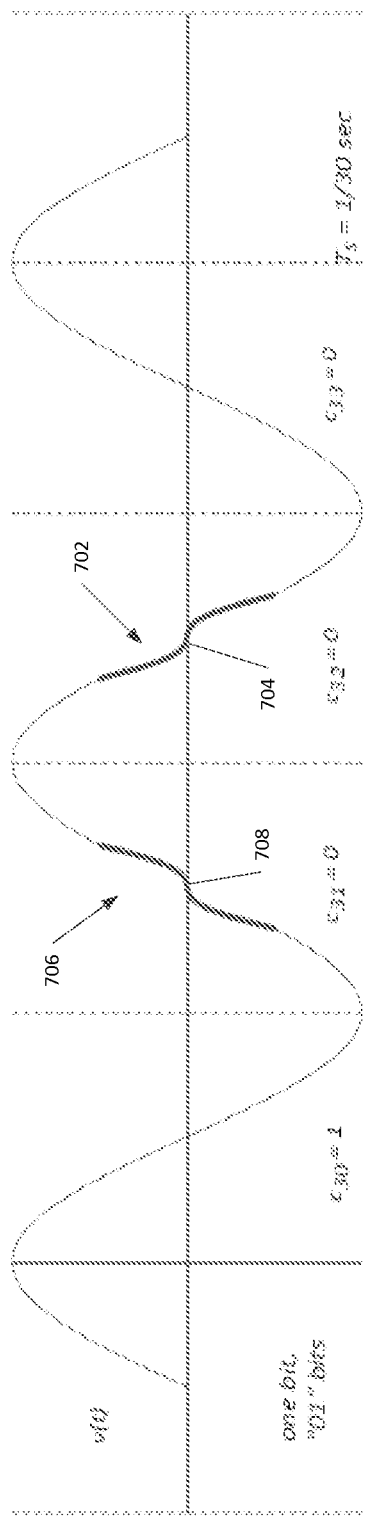
FIGS. 7A and 7B illustrate constellation waveforms for balanced modulation in which an extra bit modulation is injected on the third zero crossing immediately before the "0" bit modulation on the fourth zero crossing or immediately after the "1" bit modulation on the second zero crossing of the AC waveform.
Figure 7B:
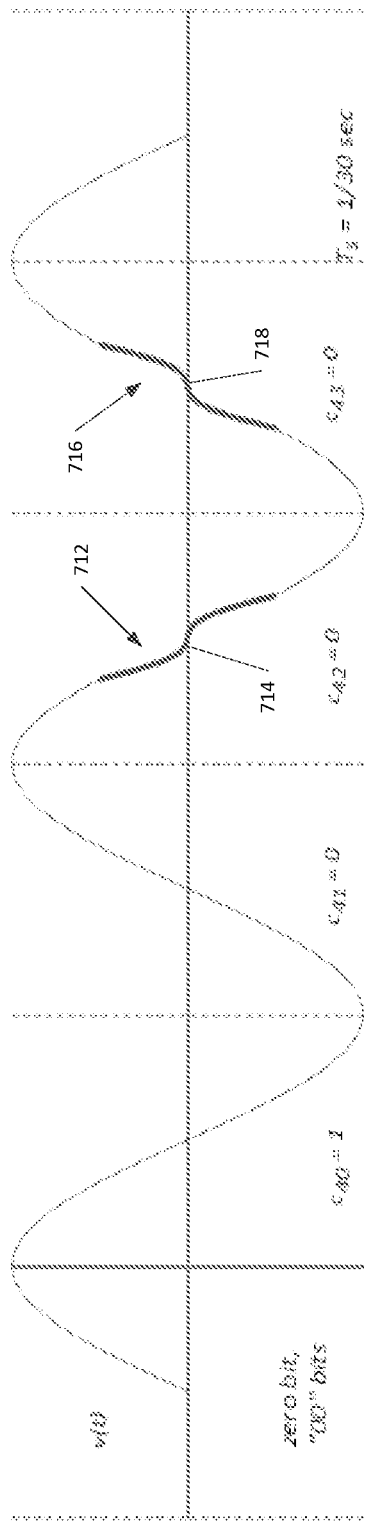

For balanced modulation as illustrated in FIGS. 7A and 7B, an extra bit modulation (e.g., pulse) 702 is injected at the third zero crossing 704 immediately after the "1" bit modulation 706 at the second zero crossing 708. Also, an extra pulse 712 is injected at the third zero crossing 714 immediately before the "0" pulse 716 at the fourth zero crossing 718. For balanced modulation, the coding system and method is as follows:

no modulation, modulation, modulation, no modulation=01 (FIG. 7A)

no modulation, no modulation, modulation, modulation=00 (FIG. 7B)

Outbound messages are composed of a 9 bit synchronization pattern followed by a message that incorporates a length field, CRC, opcode, data, etc. The 9 bit synchronization pattern is composed of a zero start bit, followed by "111 001 0" bits and terminated by a zero stop bit. The rest of the bytes of the message do not use start or stop bits.

Thus, in one form, a system and method for balanced modulation as described herein and illustrated in FIG. 1B comprises a two-way automatic communications system (TWACS) and method used by an electrical utility in which outbound messages are sent from the utility to a consumer and inbound messages are sent from the consumer to the utility. The respective outbound and inbound messages are sent and received over the utility's power distribution system. The respective outbound and inbound messages are modulated on a mains signal of the power distribution system. A receiver for detecting the outbound messages includes the analog filter component 202 for receiving the analog outbound signal r(t) including an outbound message to provide the filtered analog outbound signal (FAOS). The A/D converter 206 converts the filtered signal FAOS to a corresponding digitized filtered signal (DFS). The digital processor 200 demodulates the digitized signal DFS by detecting a bit modulation (e.g., pulse) 702 at a third zero crossing 704 of the mains signal immediately after a pulse 706 at a second zero crossing 708 of the mains signal and by detecting a pulse 712 at a third zero crossing 714 of the mains signal immediately before a pulse 716 at the fourth zero crossing 718.

Double Rate Balanced Modulation:

The Double Rate Modulation uses the same phase controlled SCR array connected to Phase A, Phase B, Phase C and Neutral connections on a modulation transformer configured with a wye secondary. Since the SCR array is configured with anti-parallel connected SCRs, both rising and falling slopes can be selected alternately in addition to selecting the six various phasor combinations. This modulation coding system and method will use both rising and falling edges of the selected phasor, encoding the outbound message bits at a rate that is twice the current rate. The balanced injection will continue to switch the SCRs in phase controlled fashion, injecting phase controlled current pulses near (around) the zero crossing of the voltage waveform, utilizing both rising and falling edges.

The combination of modulation and no modulation will still be used to create ones and zeros of the binary data stream that is being transmitted, so that the 30 bps outbound detector methods can still be used in the remote transponder units.

For double rate balanced modulation as illustrated in FIGS. 7A and 7B, every two bits 702, 706 of the outbound data stream will be encoded every two cycles of the AC waveform at consecutive zero crossings 704, 708. Also, as illustrated in FIGS. 8A and 8B, every two bits 812, 814 of the outbound data stream will be encoded every two cycles of the AC waveform at consecutive zero crossings 816, 818.

For double rate balanced modulation as illustrated in FIGS. 7A and 7B, an extra bit modulation (e.g., pulse) 702 is injected at the third zero crossing 704 immediately after the "1" bit modulation 706 at the second zero crossing 708. Also, an extra pulse 712 is injected at the third zero crossing 714 immediately before the "0" pulse 716 at the fourth zero crossing 718.

Figure 8B:
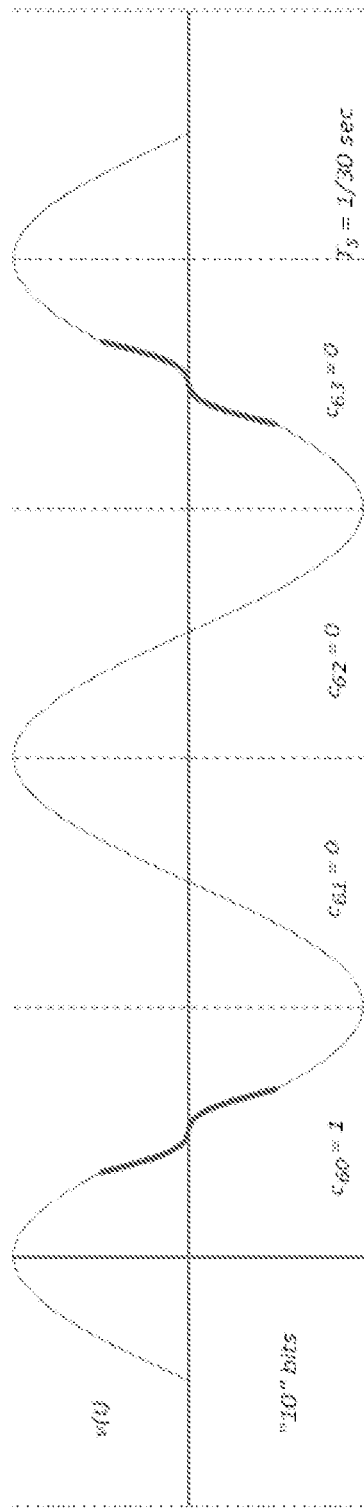

For double rate balanced modulation as illustrated in FIGS. 8A and 8B, an extra bit modulation (e.g., pulse) 804 is injected at the second zero crossing 808 immediately after the "1" bit modulation 802 at the first zero crossing 806. Also, an extra pulse 814 is injected at the fourth zero crossing 818 immediately before the "0" pulse 812 at the first zero crossing 816.

For double rate balanced modulation, the coding system and method is as follows:
  modulation, modulation, no modulation, no modulation=11 (FIG. 8A)
  modulation, no modulation, no modulation, modulation=10 (FIG. 8B)
  no modulation, modulation, modulation, no modulation=01 (FIG. 7A)
  no modulation, no modulation, modulation, modulation=00 (FIG. 7B)

Outbound messages will be composed of a one 0 bit synchronization pattern followed by a message that incorporates a length field, CRC, opcode, data, etc. The synchronization pattern is composed of "00" start bits, followed by "111 001 0" bits and terminated by a zero stop bit. The rest of the bytes of the outbound message do not use start or stop bits.

The double rate balanced modulation coding system and method described herein is compatible with the installed base of remote transponder units and can be implemented in the installed base without modification by modifying only the firmware in the outbound modulator units of the installed base.

Thus, in one form, a system and method for double rate balanced modulation as described herein and illustrated in FIG. 1A comprises a two-way automatic communications system (TWACS) and method used by an electrical utility in which outbound messages are sent from the utility to a consumer and inbound messages are sent from the consumer to the utility. The respective outbound and inbound messages are sent and received over the utility's power distribution system. The respective outbound and inbound messages are modulated on the mains signal of the power distribution system. A receiver for detecting the outbound messages includes the analog filter component 202 for receiving the analog outbound signal r(t) including an outbound message to provide the filtered analog outbound signal (FAOS). The A/D converter 206 converts the filtered signal FAOS to a corresponding digitized filtered signal (DFS). The digital processor 200 demodulates the digitized signal DFS by detecting two modulations (702 and 706; 802 and 804) of an outbound data stream every two cycles of the mains signal.

Double Strength Balanced Modulation:

The Double Strength Modulation uses the same phase controlled SCR array connected to Phase A, Phase 8, Phase C and Neutral connections on a modulation transformer configured with a wye secondary. Since the SCR array is configured with anti-parallel connected SCRs, both rising and falling slopes can be selected alternately in addition to selecting the six various phasor combinations. This modulation coding system and method will use both rising and falling edges of the selected phasor, encoding each bit in the outbound message bits twice. The balanced injection will continue to switch the SCRs in phase controlled fashion, injecting phase controlled current pulses near (around) the zero crossing of the voltage waveform, utilizing both rising and falling edges.

The combination of modulation and no modulation will still be used to create ones and zeros of the binary data stream that is being transmitted, so that the 30 bps outbound detector methods can still be used in the remote transponder units. Only one bit of the outbound data stream will be encoded every two cycles of the AC waveform. For double strength balanced modulation as illustrated in FIG. 8A, an extra bit modulation (e.g., pulse) 804 is injected at the second zero crossing 808 immediately after the "1" bit modulation 802 at the first zero crossing 806. Also, an extra pulse 712 is injected at the third zero crossing 714 immediately before the "0" pulse 716 at the fourth zero crossing 718. For double strength balanced modulation, the encoding is as follows:
  modulation, modulation, no modulation, no modulation=1 (FIG. 8A)
  no modulation, no modulation, modulation, modulation=0 (FIG. 7B)

Outbound messages are composed of a 9 bit synchronization pattern followed by a message that incorporates a length field, CRC, opcode, data, etc. The 9 bit synchronization pattern is composed of a zero start bit, followed by "111 0010" bits and terminated by a zero stop bit. The rest of the bytes of the message do not use start or stop bits.

The double strength balanced modulation coding system and method described herein is compatible with the installed base of remote transponder units and can be implemented in the installed base without modification by modifying only the firmware in the outbound modulator units of the installed base.

Thus, in one form, a system and method for double strength balanced modulation as described herein and illustrated in FIG. 1B comprises a two-way automatic communications system (TWACS) and method used by an electrical utility in which outbound messages are sent from the utility to a consumer and inbound messages are sent from the consumer to the utility. The respective outbound and inbound messages are sent and received over the utility's power distribution system. The respective outbound and inbound messages are modulated on a mains signal of the power distribution system. A receiver for detecting the outbound messages includes the analog filter component 202 for receiving the analog outbound signal r(t) including an outbound message to provide the filtered analog outbound signal (FAOS). The A/D converter 206 converts the filtered signal FAOS to a corresponding digitized filtered signal (DFS). The digital processor 200 demodulates the digitized signal DFS by detecting a bit modulation (e.g., pulse) 804 at a second zero crossing 808 of the mains signal immediately after a pulse 802 at a first zero crossing 806 of the mains signal and by detecting a pulse 712 at a third zero crossing 714 of the mains signal immediately before a pulse 716 at the fourth zero crossing 718.

Detection of Balanced TWACS Modulation:

The 30 bps outbound detector will be able to detect this balanced modulation exactly the same as the 30 bps TWACS modulation without modification. The difference is that the outbound detector will also see a pattern of zeros or ones on the opposite slope framing. The detector will not synchronize to this pattern and therefore will not be affected. Once synchronized to the OE4H pattern, the detector will frame on that pattern and collect the remainder of the outbound message as with the 30 bps detector. Thus, the systems and method provide a digital signal processor-based (DSP-based) RCE (Remote Communication Equipment) platform which retains backward compatibility with existing, installed products. No hardware changes are required in order to detect balanced modulation.

Detection of Double Rate TWACS Balanced Modulation:

To detect the Double Rate Modulation, a similar framing is performed with the exception that the "OE4H" is transmitted using twice the bit density. The same waveform tracker in the remote transponder unit can be used, collecting and comparing adjacent cycles of the waveform. The difference is that the synchronization is performed using the only the last 18 half cycle comparisons. If a "0011100100B" pattern is detected and qualified, then the message is synchronized. And the message framing can start. The detector will then use the data from the first half cycle and compare it to the third half cycle. If there is modulation on third zero cross, then a zero stored into the outbound message buffer. If there is modulation on the first zero cross, then a one is stored into the outbound message buffer. Then the detector will then use the data from the second half cycle and compare it to the fourth half cycle. If there is modulation on fourth zero cross, then a zero stored into the outbound message buffer. If there is modulation on the second zero cross, then a one is stored into the outbound message buffer.

The balanced detector co-exists with the current detector and the transponder can detect either the current rate of modulation or the balanced double rate modulation. To detect the double rate modulation, firmware in the transponder will need to updated.

Double Signal Strength Balanced Modulation:

The 30 bps outbound detector will be able to detect this balanced modulation, but will synchronize a half cycle early. A detector expecting this modulation will see twice the aggregate signal strength by adding detected data from two adjacent frames, doubling the amount of signal. The detector will still synchronize to the OE4H pattern. Once synchronized, the detector will frame on that pattern and collect the remainder of the outbound message summing the adjacent frame data.

To be able to make use of the double strength outbound, the firmware in the transponder will need to be updated. 30 bps remote transponders can coexist on a system using double strength outbound modulation.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of components, data and/or computer-executable instructions, such as program modules, stored one or more tangible non-transitory computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results may be attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. In a two-way automatic communications system (TWACS) used by an electrical utility in which outbound messages are sent from the utility to a consumer and inbound messages are sent from the consumer to the utility, the respective outbound and inbound messages being sent and received over the utility's power distribution system, a receiver for detecting the outbound messages, said receiver comprising:
   an analog filter component receiving the analog outbound signal including an outbound message to provide a filtered signal;
   an A/D converter converting the filtered signal to a corresponding digitized signal and providing the corresponding digitized signal; and
   a digital processor executing:
      a digital preprocessor component receiving the corresponding digitized signal, preprocessing the received corresponding digitized signal to provide a preprocessed digital signal; and
      a digital symbol determination component receiving the preprocessed digital signal and including a two-dimensional digital demodulating component for demodulating the received preprocessed digital signal to provide the outbound message wherein the symbol determination component comprises:
         a digital preamble detector for receiving the preprocessed digital signal and providing a symbol synchronization signal and a weight vector w corresponding to the preprocessed digital signal; and
         a digital symbol estimator component for receiving the preprocessed digital signal and for receiving the weight vector w to provide noise product signal which is:
            (1) selectively sampled by the synchronization signal to provide a first dimension $\gamma_1$ of the outbound message, and
            (2) delayed by a one-half cycle multiple ($z^{-2}$) and selectively sampled by the synchronization signal to provide a second dimension $\gamma_2$ of the outbound message, wherein the first and second dimensions $\gamma_1$ and $\gamma_2$ provide the outbound message.

2. The receiver of claim 1 wherein one of the following:
   (a) the two-dimensional digital demodulating component comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number;
   (b) a bit modulation detector circuit detects bit modulations in the filtered signal to provide a corresponding pulsed signal including the outbound message; and wherein the two-dimensional digital demodulating component comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number;
   (c) the two-dimensional digital demodulating component comprises a digital processor demodulating the corresponding digitized signal by detecting a bit modulation at a second zero crossing of the mains signal after a bit modulation at a first zero crossing of the mains signal and by detecting a bit modulation at a third zero crossing of the mains signal before a bit modulation at the fourth zero crossing indicating a one bit binary number;
   (d) a pulse detector circuit detecting pulses in the filtered signal to provide a corresponding pulsed signal including the outbound message; and wherein the two-dimensional digital demodulating component comprises a controller demodulating the corresponding pulsed signal by detecting a pulse at a second zero crossing of the mains signal after a pulse at a first zero crossing of the mains signal and by detecting a pulse at a third zero crossing of the mains signal before a pulse at the fourth zero crossing indicating a one bit binary number;
   (e) the two-dimensional digital demodulating component comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number;
   and wherein the digital processor demodulates the corresponding digitized signal by detecting a bit modulation at a second zero crossing of the mains signal after a bit modulation at a first zero crossing of the mains signal and by detecting a bit modulation at a fourth zero crossing of the mains signal before the "0" bit modulation at the first zero crossing; and
   (f) a pulse detector circuit detecting pulses in the filtered signal to provide a corresponding pulsed signal including the outbound message; and wherein the two-dimensional digital demodulating component comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number; and wherein the controller demodulates the corresponding pulsed signal by detecting a pulse at a second zero crossing of the mains signal after a pulse at a first zero crossing of the mains signal and by detecting a pulse at a fourth zero crossing of the mains signal before the "0" pulse at the first zero crossing.

3. The receiver of claim 1 wherein the filter component comprises:
   a carrier notch filter receiving the analog outbound signal and canceling the carrier signal to provide an analog message signal; and
   a low-pass filter (LPF) component receiving the analog outbound signal and filtering the analog outbound signal to provide a filtered analog outbound signal;

and wherein the A/D converter comprises:
  a first A/D converter digitizing the analog message signal into a digitized message signal, and
  a second A/D converter digitizing the filtered analog outbound signal and providing a digital filtered signal.

4. The receiver of claim 3 wherein the digital processor includes a buffering component comprising:
  a buffer receiving the digitized message signal and sequentially providing a half-cycle buffered signal corresponding thereto, and
  a phase locked loop (PLL) component receiving the digitized filtered signal and providing a half-cycle synchronization signal corresponding thereto, said half-cycle synchronization signal sampling the half-cycle buffered signal to provide a corresponding digital signal.

5. The receiver of claim 4 wherein the digital preprocessor component comprises:
  a fast Fourier transform (FFT) component receiving the corresponding digital signal and providing a frequency domain signal corresponding to the digital signal; and
  a dimension reduction component connected to the FFT component for receiving the frequency domain signal, said dimension reduction component providing a discretization signal corresponding to the digital signal with reduced resolution.

6. In a two-way automatic communications system (TWACS) used by an electrical utility in which outbound messages are sent from the utility to a consumer and inbound messages are sent from the consumer to the utility, the respective outbound and inbound messages being sent and received over the utility's power distribution system, the respective outbound and inbound messages being modulated on a mains signal of the power distribution system, a receiver for detecting the outbound messages, said receiver comprising:
  an analog filter component receiving an outbound signal including an outbound message to provide a filtered signal including the outbound message; and
  a detecting circuit receiving the filtered signal including the outbound message to provide a corresponding signal including the outbound message; and
  a demodulator for demodulating the corresponding signal by detecting at least two modulations every two cycles of the mains signal by detecting a bit modulation at a zero crossing of the mains signal relative to a half-cycle delay of a bit modulation at a another zero crossing of the mains signal.

7. The receiver of claim 6 wherein the detecting circuit comprises an A/D converter converting the filtered signal to a corresponding digitized signal and providing the corresponding digitized signal; and
  wherein the demodulator comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number.

8. The receiver of claim 6 wherein the detecting circuit comprises a bit modulation detector circuit detecting bit modulations in the filtered signal to provide a corresponding pulsed signal including the outbound message; and
  wherein the demodulator comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number.

9. The receiver of claim 6 wherein the detecting circuit comprises an A/D converter converting the filtered signal to a corresponding digitized signal and providing the corresponding digitized signal; and
  wherein the demodulator comprises a digital processor demodulating the corresponding digitized signal by detecting a bit modulation at a second zero crossing of the mains signal after a bit modulation at a first zero crossing of the mains signal and by detecting a bit modulation at a third zero crossing of the mains signal before a bit modulation at the fourth zero crossing indicating a one bit binary number.

10. The receiver of claim 6 wherein the detecting circuit comprises a pulse detector circuit detecting pulses in the filtered signal to provide a corresponding pulsed signal including the outbound message; and
  wherein the demodulator comprises a controller demodulating the corresponding pulsed signal by detecting a pulse at a second zero crossing of the mains signal after a pulse at a first zero crossing of the mains signal and by detecting a pulse at a third zero crossing of the mains signal before a pulse at the fourth zero crossing indicating a one bit binary number.

11. The receiver of claim 6 wherein the detecting circuit comprises an A/D converter converting the filtered signal to a corresponding digitized signal and providing the corresponding digitized signal; and
  wherein the demodulator comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number; and
  wherein the digital processor demodulates the corresponding digitized signal by detecting a bit modulation at a second zero crossing of the mains signal after a bit modulation at a first zero crossing of the mains signal and by detecting a bit modulation at a fourth zero crossing of the mains signal before the "0" bit modulation at the first zero crossing.

12. The receiver of claim 6 wherein the detecting circuit comprises a pulse detector circuit detecting pulses in the filtered signal to provide a corresponding pulsed signal including the outbound message; and
  wherein the demodulator comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number; and
  wherein the controller demodulates the corresponding pulsed signal by detecting a pulse at a second zero crossing of the mains signal after a pulse at a first zero crossing of the mains signal and by detecting a pulse at a fourth zero crossing of the mains signal before the "0" pulse at the first zero crossing.

13. A two-way automatic communications system (TWACS) used by an electrical utility comprising:
  a substation transceiver configured for sending analog outbound messages from the utility to a consumer;
  a transponder configured for sending inbound messages to the transceiver from the consumer to the utility, the respective outbound and inbound messages being modulated on a mains signal of the utility's power distribution system; and a receiver included in the transponder configured for enabling the detection of the outbound messages, said receiver comprising:

an analog filter component receiving an outbound signal including an outbound message to provide a filtered signal including the outbound message; and a detecting circuit receiving the filtered signal including the outbound message to provide a corresponding signal including the outbound message; and a demodulator for demodulating the corresponding signal by detecting at least two modulations every two cycles of the mains signal by detecting a bit modulation at a zero crossing of the mains signal relative to a half-cycle delay of a bit modulation at a another zero crossing of the mains signal.

14. The receiver of claim 13 wherein the detecting circuit comprises an A/D converter converting the filtered signal to a corresponding digitized signal and providing the corresponding digitized signal; and wherein the demodulator comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number.

15. The receiver of claim 13 wherein the detecting circuit comprises a bit modulation detector circuit detecting bit modulations in the filtered signal to provide a corresponding pulsed signal including the outbound message; and wherein the demodulator comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number.

16. The receiver of claim 13 wherein the detecting circuit comprises an A/D converter converting the filtered signal to a corresponding digitized signal and providing the corresponding digitized signal; and wherein the demodulator comprises a digital processor demodulating the corresponding digitized signal by detecting a bit modulation at a second zero crossing of the mains signal after a bit modulation at a first zero crossing of the mains signal and by detecting a bit modulation at a third zero crossing of the mains signal before a bit modulation at the fourth zero crossing indicating a one bit binary number.

17. The receiver of claim 13 wherein the detecting circuit comprises a pulse detector circuit detecting pulses in the filtered signal to provide a corresponding pulsed signal including the outbound message; and wherein the demodulator comprises a controller demodulating the corresponding pulsed signal by detecting a pulse at a second zero crossing of the mains signal after a pulse at a first zero crossing of the mains signal and by detecting a pulse at a third zero crossing of the mains signal before a pulse at the fourth zero crossing indicating a one bit binary number.

18. The receiver of claim 13 wherein the detecting circuit comprises an A/D converter converting the filtered signal to a corresponding digitized signal and providing the corresponding digitized signal; and wherein the demodulator comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number; and wherein the digital processor demodulates the corresponding digitized signal by detecting a bit modulation at a second zero crossing of the mains signal after a bit modulation at a first zero crossing of the mains signal and by detecting a bit modulation at a fourth zero crossing of the mains signal before the "0" bit modulation at the first zero crossing.

19. The receiver of claim 13 wherein the detecting circuit comprises a pulse detector circuit detecting pulses in the filtered signal to provide a corresponding pulsed signal including the outbound message; and wherein the demodulator comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number; and wherein the controller demodulates the corresponding pulsed signal by detecting a pulse at a second zero crossing of the mains signal after a pulse at a first zero crossing of the mains signal and by detecting a pulse at a fourth zero crossing of the mains signal before the "0" pulse at the first zero crossing.

20. A two-way automatic communications system (TWACS) used by an electrical utility comprising:

a substation transceiver configured for sending analog outbound messages from the utility to a consumer;

a transponder configured for sending inbound messages to the transceiver from the consumer to the utility, the respective outbound and inbound messages being modulated on a mains signal of the utility's power distribution system; and a receiver included in the transponder configured for enabling the detection of the outbound messages, said receiver comprising:

an analog filter component receiving the analog outbound signal including an outbound message to provide a filtered signal;

an A/D converter converting the filtered signal to a corresponding digitized signal and providing the corresponding digitized signal; and a digital processor executing:

a digital preprocessor component receiving the corresponding digitized signal, preprocessing the received corresponding digitized signal to provide a preprocessed digital signal; and a digital symbol determination component receiving the preprocessed digital signal and a two-dimensional digital demodulating component for digitally demodulating the received preprocessed digital signal to provide the outbound message wherein the symbol determination component comprises:

a digital preamble detector component for receiving the preprocessed digital signal and providing a symbol synchronization signal and a weight vector w corresponding to the preprocessed digital signal; and a digital symbol estimator component for receiving the preprocessed digital signal and for receiving the weight vector w to provide a noise product signal which is:
(1) selectively sampled by the synchronization signal to provide a first dimension $\gamma_1$ of the outbound message, and
(2) delaying by a one-half cycle multiple ($z^{-2}$) and selectively sampled by the synchronization signal to provide a second dimension $\gamma_2$ of the outbound message, wherein the first and second dimensions $\gamma_1$ and $\gamma_2$ provide the outbound message.

21. The receiver of claim 20 wherein one of the following:
(a) the two-dimensional digital demodulating component comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number;
(b) a bit modulation detector circuit detects bit modulations in the filtered signal to provide a corresponding pulsed signal including the outbound message; and wherein the two-dimensional digital demodulating component comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number;
(c) the two-dimensional digital demodulating component comprises a digital processor demodulating the corresponding digitized signal by detecting a bit modulation at a second zero crossing of the mains signal after a bit modulation at a first zero crossing of the mains signal and by detecting a bit modulation at a third zero crossing of the mains signal before a bit modulation at the fourth zero crossing indicating a one bit binary number;
(d) a pulse detector circuit detecting pulses in the filtered signal to provide a corresponding pulsed signal including the outbound message; and wherein the two-dimensional digital demodulating component comprises a controller demodulating the corresponding pulsed signal by detecting a pulse at a second zero crossing of the mains signal after a pulse at a first zero crossing of the mains signal and by detecting a pulse at a third zero crossing of the mains signal before a pulse at the fourth zero crossing indicating a one bit binary number;
(e) the two-dimensional digital demodulating component comprises a digital processor demodulating the corresponding digitized signal by detecting a bit modulation at a third zero crossing of the mains signal after a bit modulation at a second zero crossing of the mains signal and by detecting a bit modulation at a third zero crossing of the mains signal before a bit modulation at the fourth zero crossing indicating a two bit binary number;
and wherein the digital processor demodulates the corresponding digitized signal by detecting a bit modulation at a second zero crossing of the mains signal after a bit modulation at a first zero crossing of the mains signal and by detecting a bit modulation at a fourth zero crossing of the mains signal before the "0" bit modulation at the first zero crossing; and
(f) a pulse detector circuit detecting pulses in the filtered signal to provide a corresponding pulsed signal including the outbound message; and wherein the two-dimensional digital demodulating component comprises a controller demodulating the corresponding pulsed signal by detecting a pulse at a third zero crossing of the mains signal after a pulse at a second zero crossing of the mains signal and by detecting a pulse at a third zero crossing of the mains signal before a pulse at the fourth zero crossing indicating a two bit binary number; and wherein the controller demodulates the corresponding pulsed signal by detecting a pulse at a second zero crossing of the mains signal after a pulse at a first zero crossing of the mains signal and by detecting a pulse at a fourth zero crossing of the mains signal before the "0" pulse at the first zero crossing.

22. The receiver of claim 20 wherein the filter component comprises:
a carrier notch filter receiving the analog outbound signal and canceling the carrier signal to provide an analog message signal; and
a low-pass filter (LPF) component receiving the analog outbound signal and filtering the analog outbound signal to provide a filtered analog outbound signal;
and wherein the A/D converter comprises:
a first A/D converter digitizing the analog message signal into a digitized message signal;
and a second A/D converter digitizing the filtered analog outbound signal and providing a digital filtered signal.

23. The receiver of claim 22 wherein the digital processor includes a buffering component comprising:
a buffer receiving the digitized message signal and sequentially providing a half-cycle buffered signal corresponding thereto, and
a phase locked loop (PLL) component receiving the digitized filtered signal and providing a half-cycle synchronization signal corresponding thereto, said half-cycle synchronization signal sampling the half-cycle buffered signal to provide a corresponding digital signal.

24. The receiver of claim 23 wherein the digital preprocessor component comprises:
a fast Fourier transform (FFT) component receiving the corresponding digital signal and providing a frequency domain signal corresponding to the digital signal; and
a dimension reduction component connected to the FFT component for receiving the frequency domain signal, said dimension reduction component providing a discretization signal corresponding to the digital signal with reduced resolution.

25. In a two-way automatic communications system (TWACS) used by an electrical utility in which analog outbound messages are sent from the utility to a consumer and inbound messages are sent from the consumer to the utility, the respective outbound and inbound messages being modulated on a mains signal of the utility's power distribution system, a method for detecting the outbound messages comprising:
receiving the analog outbound signal including an outbound message;
converting the received analog outbound signal to a corresponding digitized signal;
preprocessing the corresponding digitized signal to provide a preprocessed digital signal; and
digitally demodulating the preprocessed digital signal in two dimensions to provide the outbound message wherein the demodulating comprises:
receiving the preprocessed digital signal and providing a symbol synchronization signal and a weight vector w corresponding to the preprocessed digital signal; and receiving the preprocessed digital signal and receiving the weight vector to provide a noise product signal which is:
(1) selectively sampled by the synchronization signal to provide a first dimension $\gamma_1$ of the outbound message, and
(2) delayed by a one-half cycle multiple ($z^{-2}$) and selectively sampled by the synchronization signal to provide a second dimension $\gamma_2$ of the outbound message, wherein the first and second dimensions $\gamma_1$ and $\gamma_2$ provide the outbound message.

26. In a two-way automatic communications system (TWACS) used by an electrical utility in which analog outbound messages are sent from the utility to a consumer and inbound messages are sent from the consumer to the utility, the respective outbound and inbound messages being modulated on a mains signal of the utility's power distribution system, a method for detecting the outbound messages comprising:
receiving an outbound signal including an outbound message to provide a filtered signal including the outbound message; and
receiving the filtered signal including the outbound message to provide a corresponding signal including the outbound message; and
demodulating the corresponding signal by detecting at least two modulations every two cycles of the mains signal wherein the demodulating comprises:
receiving the preprocessed digital signal and providing a symbol synchronization signal and a weight vector w corresponding to the preprocessed digital signal; and
receiving the preprocessed digital signal and receiving the weight vector to provide a noise product signal which is:
(1) selectively sampled by the synchronization signal to provide a first dimension $\gamma_1$ of the outbound message, and
(2) delayed by a one-half cycle multiple ($z^{-2}$) and selectively sampled by the synchronization signal to provide a second dimension $\gamma_2$ of the outbound message, wherein the first and second dimensions $\gamma_1$ and $\gamma_2$ provide the outbound message.

* * * * *